United States Patent
Yu et al.

(10) Patent No.: US 7,584,098 B2
(45) Date of Patent: Sep. 1, 2009

(54) VOCABULARY-INDEPENDENT SEARCH OF SPONTANEOUS SPEECH

(75) Inventors: Roger Peng Yu, Beijing (CN); Frank Torsten Seide, Beijing (CN)

(73) Assignee: Microsoft Corporation, Redmond, WA (US)

( * ) Notice: Subject to any disclaimer, the term of this patent is extended or adjusted under 35 U.S.C. 154(b) by 1006 days.

(21) Appl. No.: 10/998,451

(22) Filed: Nov. 29, 2004

(65) Prior Publication Data

US 2006/0116997 A1    Jun. 1, 2006

(51) Int. Cl.
*G10L 15/00* (2006.01)
(52) U.S. Cl. .............. 704/240; 704/231; 704/232; 704/233; 704/242
(58) Field of Classification Search .......... 704/259, 704/215, 231, 232, 233, 240, 242
See application file for complete search history.

(56) References Cited

U.S. PATENT DOCUMENTS

| | | | | |
|---|---|---|---|---|
| 5,027,408 A | * | 6/1991 | Kroeker et al. | 704/254 |
| 5,425,129 A | * | 6/1995 | Garman et al. | 704/256 |
| 5,502,790 A | * | 3/1996 | Yi | 704/256 |
| 5,526,465 A | * | 6/1996 | Carey et al. | 704/250 |
| 5,797,123 A | * | 8/1998 | Chou et al. | 704/256.5 |
| 5,848,388 A | * | 12/1998 | Power et al. | 704/239 |

OTHER PUBLICATIONS

F. Seide, et al., "Vocabulary-Independent Search in Spontaneous Speech," Proc. ICASSP '04, Montreal, 2004.
P. Yu et al., "A Hydrid Word / Phoneme-Based Approach for Improved Vocabulary-Independent Search in Spontaneous Speech," ICSLP, Oct. 2004.
C. Allauzen et al., "General Indexation of Weighted Automata—Application to Spoken Utterance Retrieval," Proc. HLT '04.
J. Garofolo. "TREC-9 Spoken Document Retrieval Track" National Institute of Standards and Technology, http://trec.nist.gov/pubs/trec9/sdrt9_slides/sld001.htm.
M. Saraclar et al., "Lattice-Based Search for Spoken Utterance Retrieval," Proc. HLTNAACL 2004.
S. Dharanipragada and S. Roukos, "A Multistage Algorithm for Spotting New Words in Speech," IEEE Transactions on Speech and Audio Processing, vol. 10, issue 8, pp. 542-550, 2002.

* cited by examiner

*Primary Examiner*—Richemond Dorvil
*Assistant Examiner*—Eric Yen
(74) *Attorney, Agent, or Firm*—Theodore M. Magee; Westman, Champlin & Kelly, P.A.

(57) ABSTRACT

A method of identifying a location of a query string in an audio signal is provided. Under the method, a segment of the audio signal is selected. A score for a query string in the segment of the audio signal is determined by determining the product of probabilities of overlapping sequences of tokens. The score is then used to decide if the segment of the audio signal is likely to contain the query string.

22 Claims, 6 Drawing Sheets

VOCABULARY-INDEPENDENT SEARCH OF SPONTANEOUS SPEECH

BACKGROUND OF THE INVENTION

The present invention relates to searching audio signals for query strings. In particular, the present invention relates to performing such searches without prior knowledge of the vocabulary of the query string.

With increases in the storage capacity of computing devices, it has become easier to store large amounts of recorded speech in a digital format. To help users find a particular segment of recorded speech, systems have developed that allow a user to search the recorded speech for particular keywords. These systems typically perform speech recognition on the recorded speech to identify words represented by the speech. Text strings representing the search query are then compared to the recognized words to identify the portion of the audio signal that contains the query terms.

One challenge to these audio search systems is that speech recognition is imperfect. Because of this, if a system uses a single speech recognition output, it will have poor recall when the recognizer makes an error. For example, if the recognizer identifies the word "ball" but the speech signal actually contained the word "doll", the audio search system will not return a match for the query term "doll" even though it is present in the speech signal.

To avoid this problem, many systems have utilized a lattice of possible speech recognition results instead of a single speech recognition result. Although this lattice approach improves recall, it greatly increases the amount of time needed to search for a query term. In addition, existing text-level indexing methods can not be trivially applied.

To speed up the search, it has been proposed that indexes should be generated from the lattice before the search query is received. Such indexes identify the location of particular sets of keywords in the audio signal. When the query is received, the index is consulted to find the location of the keywords of the query.

Such indexes must be very large in order to cover all possible query terms that may appear. In addition, it has been found that such indexes typically lack query terms that are the most useful in differentiating one portion of the audio signal from another. In particular, terms that are infrequently used, and thus are less likely to be included in the index, are more likely to differentiate two audio segments.

To overcome this problem, the prior art has suggested using indexes of sequences of sub-word units, such as phonemes, instead of full keywords. For example, the sequences can be formed of 4-grams of phonemes. Because these sequences are typically shorter than keywords, there are fewer possible sequences that need to be included in the index.

In one prior art system (discussed in C. Allauzen et al., *General Indexation of Weighted Automata-Application to Spoken Utterance Retrieval*, Proc. HLT'04), each sequence of sub-word tokens is placed in the index with an expected term frequency of the sequence. This expected term frequency, also known as the expected count, is an indication of the number of times that the sequence of sub-word tokens appears in a lattice associated with a segment of the audio signal. When a query is received, it is divided into sub-word tokens and sequences of sub-word tokens are identified in the query. The expected term frequency of the query is then determined by using the expected term frequency of the sequence of sub-word tokens that has the lowest expected term frequency in the index. Such indexing is done for a plurality of segments of the speech signal and the segment with the highest expected term frequency is identified as containing the query term.

One problem with this prior art technique is that approximating the expected term frequency of the query by the minimum expected term frequency of all of its sub-word token sequences causes the worst matching sub-word token sequence to dominate the estimate. In addition, the sequence relationship between the individual sub-word token sequences is not exploited under the prior art.

SUMMARY OF THE INVENTION

A method of identifying a location of a query string in an audio signal is provided. Under the method, a segment of the audio signal is selected. A score for a query string in the segment of the audio signal is determined by determining the product of probabilities of overlapping sequences of tokens. The score is then used to decide if the segment of the audio signal is likely to contain the query string.

DETAILED DESCRIPTION OF ILLUSTRATIVE EMBODIMENTS

Figure 1:
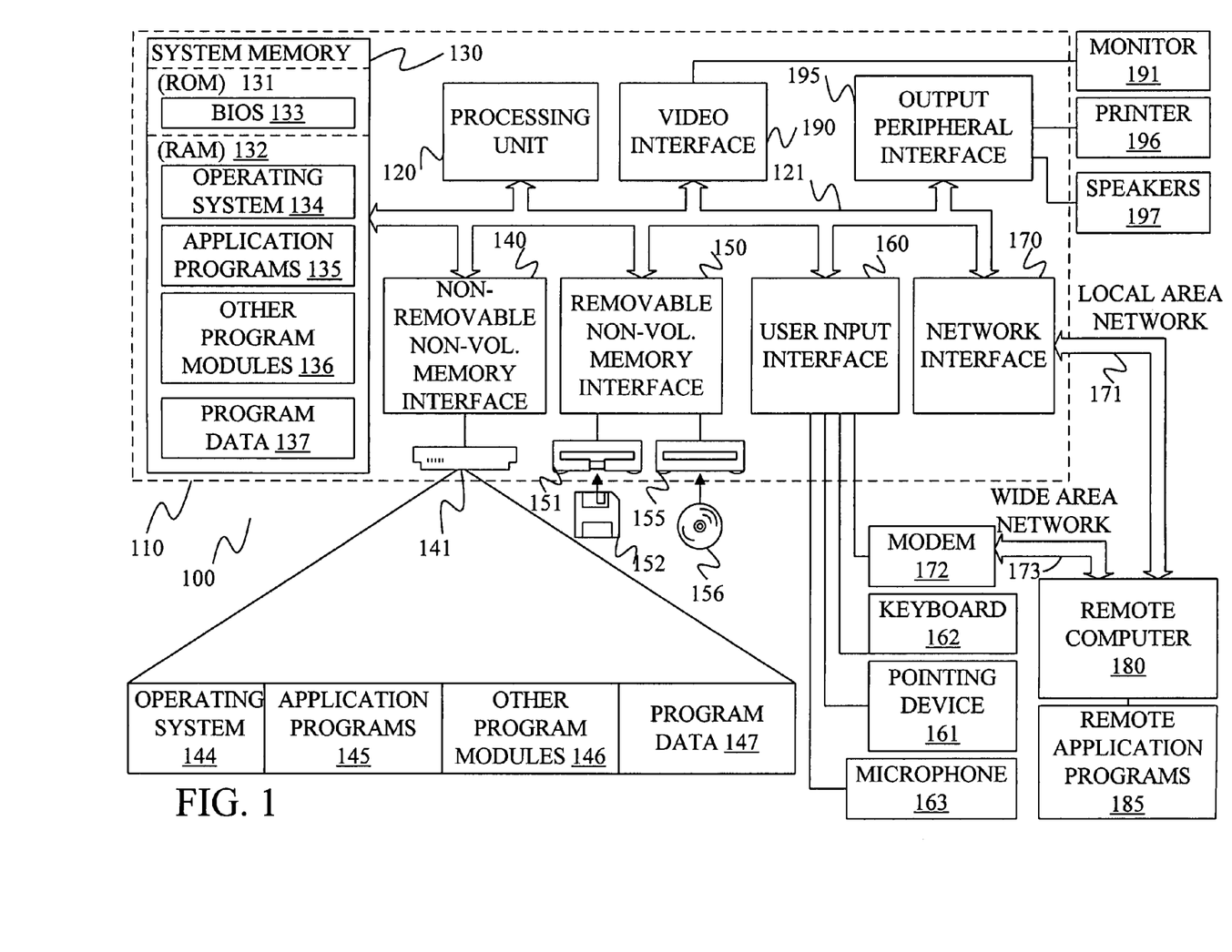
FIG. 1 is a block diagram of one computing environment in which the present invention may be practiced.

FIG. 1 illustrates an example of a suitable computing system environment 100 on which the invention may be implemented. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The invention is operational with numerous other general purpose or special purpose computing system environments or configurations. Examples of well-known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, telephony systems, distributed computing environments that include any of the above systems or devices, and the like.

The invention may be described in the general context of computer-executable instructions, such as program modules, being executed by a computer. Generally, program modules include routines, programs, objects, components, data structures, etc. that perform particular tasks or implement particular abstract data types. The invention is designed to be practiced in distributed computing environments where tasks are performed by remote processing devices that are linked through a communications network. In a distributed computing environment, program modules are located in both local and remote computer storage media including memory storage devices.

With reference to FIG. 1, an exemplary system for implementing the invention includes a general-purpose computing device in the form of a computer 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1, provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies.

A user may enter commands and information into the computer 110 through input devices such as a keyboard 162, a microphone 163, and a pointing device 161, such as a mouse, trackball or touch pad. Other input devices (not shown) may include a joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 195.

The computer 110 is operated in a networked environment using logical connections to one or more remote computers, such as a remote computer 180. The remote computer 180 may be a personal computer, a hand-held device, a server, a router, a network PC, a peer device or other common network node, and typically includes many or all of the elements described above relative to the computer 110. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 1 illustrates remote application programs 185 as residing on remote computer 180. It will be appreciated that the network connections shown are exemplary and other means of establishing a communications link between the computers may be used.

Figure 2:
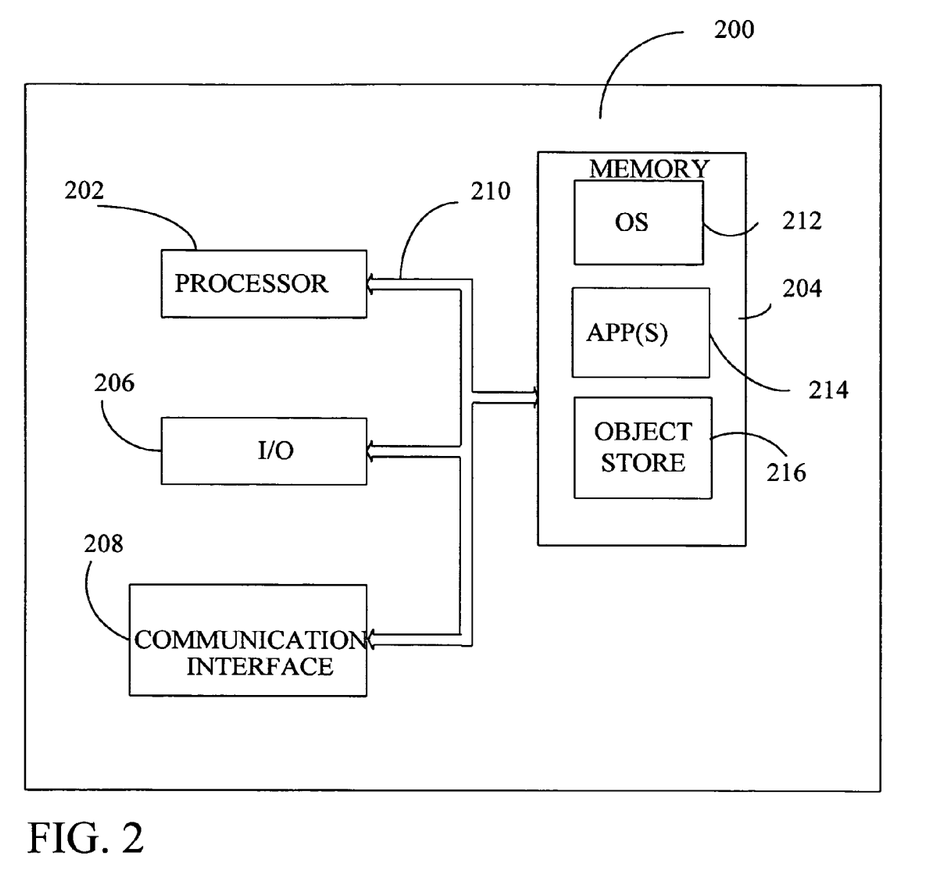
FIG. 2 is a block diagram of an alternative computing environment in which the present invention may be practiced.

FIG. 2 is a block diagram of a mobile device 200, which is an exemplary computing environment. Mobile device 200 includes a microprocessor 202, memory 204, input/output (I/O) components 206, and a communication interface 208 for communicating with remote computers or other mobile devices. In one embodiment, the afore-mentioned components are coupled for communication with one another over a suitable bus 210.

Memory 204 is implemented as non-volatile electronic memory such as random access memory (RAM) with a battery back-up module (not shown) such that information stored in memory 204 is not lost when the general power to mobile device 200 is shut down. A portion of memory 204 is preferably allocated as addressable memory for program execution, while another portion of memory 204 is preferably used for storage, such as to simulate storage on a disk drive.

Memory 204 includes an operating system 212, application programs 214 as well as an object store 216. During operation, operating system 212 is preferably executed by processor 202 from memory 204. Operating system 212, in one preferred embodiment, is a WINDOWS® CE brand operating system commercially available from Microsoft Corporation. Operating system 212 is preferably designed for mobile devices, and implements database features that can be utilized by applications 214 through a set of exposed application programming interfaces and methods. The objects in object store 216 are maintained by applications 214 and operating system 212, at least partially in response to calls to the exposed application programming interfaces and methods.

Communication interface 208 represents numerous devices and technologies that allow mobile device 200 to send and receive information. The devices include wired and wireless modems, satellite receivers and broadcast tuners to name a few. Mobile device 200 can also be directly connected to a computer to exchange data therewith. In such cases, communication interface 208 can be an infrared transceiver or a serial or parallel communication connection, all of which are capable of transmitting streaming information.

Input/output components 206 include a variety of input devices such as a touch-sensitive screen, buttons, rollers, and a microphone as well as a variety of output devices including an audio generator, a vibrating device, and a display. The devices listed above are by way of example and need not all be present on mobile device 200. In addition, other input/output devices may be attached to or found with mobile device 200 within the scope of the present invention.

Figure 3:
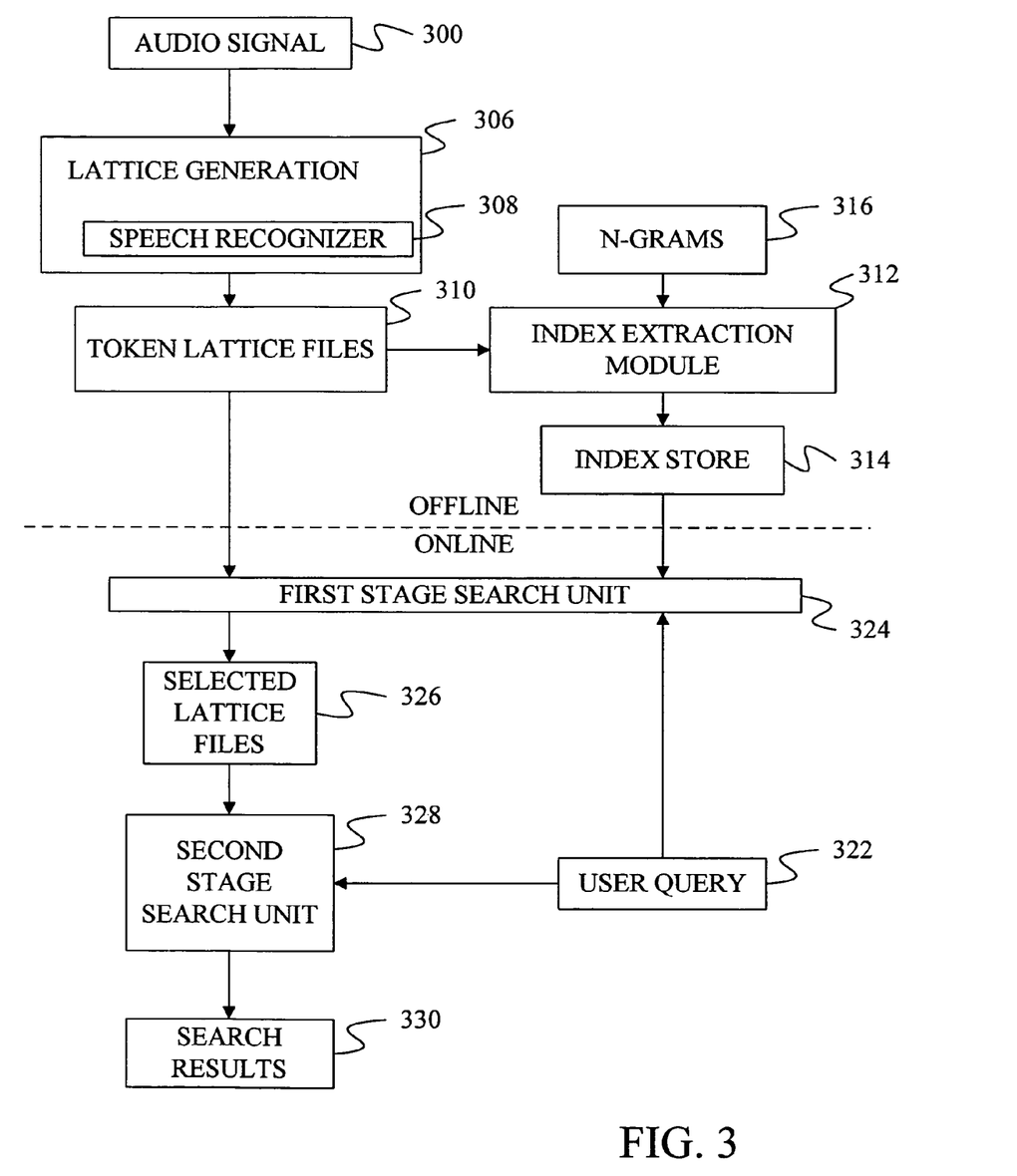
FIG. 3 is a block diagram of a two-stage index search system under one embodiment of the present invention.

The present invention provides a system for indexing and searching an audio signal without requiring any prior knowledge about the possible keywords that may be provided in a query. FIG. 3 provides a block diagram of one embodiment of the system of the present invention for performing indexing and searching of audio signals.

In FIG. 3, an audio signal 300 is provided to a lattice generation module 306, which includes a speech recognizer 308. Speech recognizer 308 divides audio signal 300 into a set of segments that have a substantially similar duration. Under one embodiment, lattice generation module 306 divides the audio signal at points of silence in the audio signal. Under one embodiment, the segments are each approximately fifteen seconds in length. Those skilled in the art will recognize that other segment lengths such as thirty seconds and sixty seconds can also be used.

Figure 4:
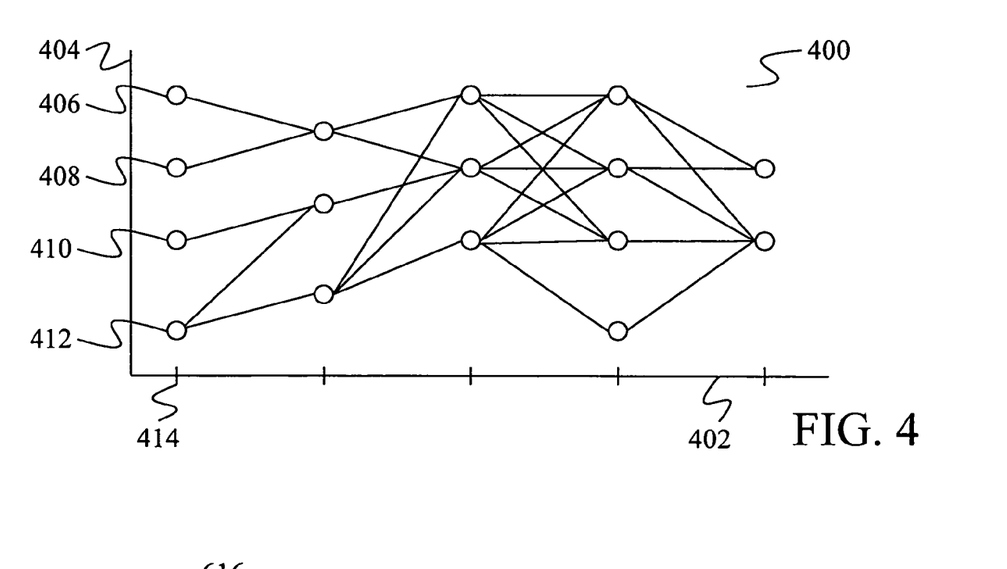
FIG. 4 is an example of a recognition lattice for a segment of speech signal.

Lattice generation module 306 takes each audio segment in turn and forms a token lattice such as lattice 400 of FIG. 4. This token lattice provides a network of token nodes where time is shown along a horizontal axis 402 and tokens are shown along vertical axis 404. At each discrete time point in lattice 400, a set of possible tokens is identified such as tokens 406, 408, 410 and 412 at time point 414. Under some embodiments, these tokens are sub-word units such as phonemes and syllables. In other embodiments, the tokens are individual words. In still further embodiments, two different lattices are formed, one with sub-word units and one with full word units.

The tokens at each time point are speech units that have been recognized by speech recognizer 308 as possibly representing the speech in the audio signal. Each token has an associated probability that is assigned by the speech recognizer based on the degree to which the audio signal matches an acoustic model for the token. Thus, some tokens may be more probable than other tokens at any given time point. Speech recognizer 308 also provides allowed transitions between the tokens at different time points (and at same time point with different context) creating the transition network shown in FIG. 4. The probability of any one path through the network can be determined by multiplying the probabilities of each token along the path.

Lattice generation module 306 generates a separate token lattice for each audio segment. This creates a set of token lattice files 310 in FIG. 3.

Token lattice files 310 are provided to an index extraction module 312, which generates one or more index files that are stored in an index store 314. An index file provides expected term frequencies or probabilities for each of a set of n-grams 316. Under one embodiment, the set of n-grams 316 is identified by an n-gram trainer from a background dictionary. Specifically, in such embodiments, only those n-grams that are found in words in background dictionary are included as n-grams 316. This reduces the number of n-grams that must be considered during indexing by eliminating those n-grams that do not typically occur in a language. In some embodiments, the n-gram trainer is a simple selector filter that selects all n-grams in the background dictionary. In other embodiments, more complex algorithms are used to select the n-grams.

One disadvantage of using a limited set of n-grams is that some n-grams that are present in the audio segment will not be listed in n-gram list 316. As a result, these n-grams will be left out of the index files of index store 314. To overcome this, an embodiment of the present invention provides a backoff strategy to deal with n-grams that are not present in n-grams 316. This strategy is discussed further below.

Figure 5:
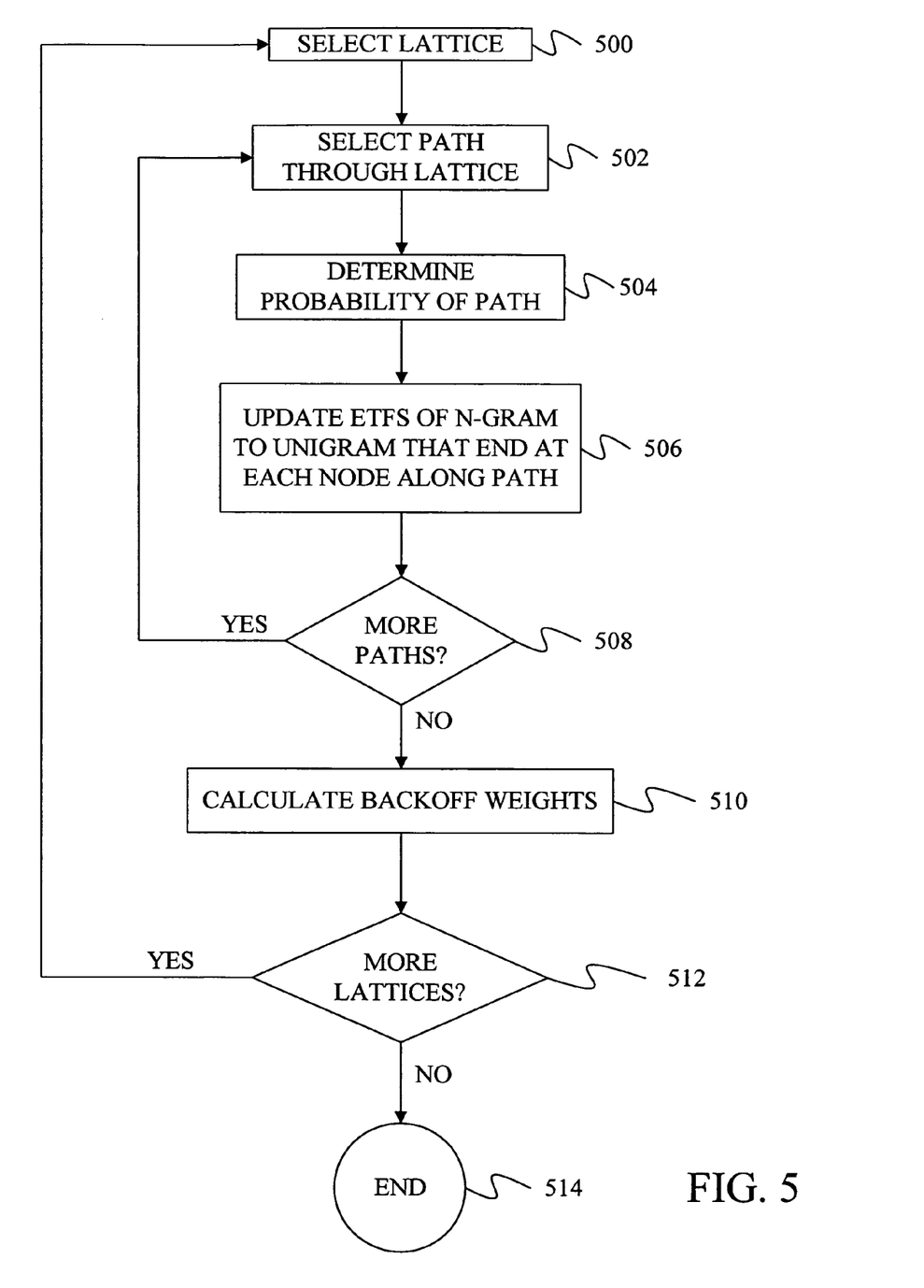
FIG. 5 is a flow diagram for a method of constructing an index.

The process for creating an index file is shown in the flow diagram of FIG. 5. In step 500 of FIG. 5 a lattice is selected. At step 502, a path through the lattice is selected. Using the probabilities of the tokens along the path, a probability of the path is determined at step 504. This can be determined by multiplying the probabilities of the individual tokens along the path to form the total probability of the path.

At step 506, each node along the path is sequentially selected. At each node, an expected term frequency for an n-gram along the path that ends at that node is updated. In order for the n-gram to be updated, it must be found within the list of n-grams 316. To update the expected term frequency of the n-gram, the probability of the path is added to the pervious value of the expected term frequency.

In addition, the expected term frequency for every sequence of tokens along the path of length n−1 to 1 that ends in the selected token is updated at step 506. Thus, if n=5, the expected term frequency for a 5-gram, a 4-gram, a 3-gram, a bigram and a unigram, that end at the current node along the selected path and are found in the background dictionary would be updated at step 506.

After the expected term frequencies for all token sequences of length n to 1 have been updated for all of the tokens along the selected path, the process determines if there are more paths at step 508. If there are more paths, the process returns to step 502 and the next path through the lattice is selected. Steps 504 and 506 are then repeated for the new path.

Those skilled in the art will recognize that the description above provides one example of how to traverse a lattice to form the index. Other techniques for traversing the lattice, such as changing the order of the steps described above, are within the scope of the present invention.

When there are no further paths at step 508, the process continues at step 510 where backoff weights are determined. The backoff weights are used during a backoff strategy when an n-gram is not found in an index file, as discussed further below. The backoff weights are calculated such that for each history h in the lattice, which consists of a sequence of n tokens $q_{i-n+1}, \ldots, q_{i-1}$ the following is true:

$$\sum_{\forall q_i} \tilde{P}(q_i \mid h, O^s) = 1 \qquad \text{EQ. 1}$$

where $$\tilde{P}(q_i \mid q_{i-j+1}, \ldots, q_{i-1}, O^s) = \begin{cases} \tilde{P}_{MELL}(q_i \mid q_{i-j+1}, \ldots, q_{i-1}, O^s) \\ \quad \text{if } (q_{i-j+1}, \ldots, q_i) \in K \\ B(q_{i-j+1}, \ldots, q_{i-1} \mid O^s) \cdot \\ \quad \tilde{P}(q_i \mid q_{i-j+2}, \ldots, q_{i-1}, O^s) \\ \quad \text{if } (q_{i-j+1}, \ldots, q_i) \notin K \\ \quad \text{but } (q_{i-j+1}, \ldots, q_{i-1}) \in K \\ \tilde{P}_{MELL}(q_i \mid q_{i-j+2}, \ldots, q_{i-1}, O^s) \\ \quad \text{otherwise} \end{cases} \qquad \text{EQ. 2}$$

where $$\tilde{P}_{MELL}(q_i \mid q_{i-j+1}, \ldots, q_{i-1}, O^s) = \frac{ETF_s(q_{i-j+1}, \ldots, q_i)}{ETF_s(q_{i-j+1}, \ldots, q_{i-1})} \qquad \text{EQ. 3}$$

where $\tilde{P}(q_i|q_{i-j+1}, \ldots, q_{i-1}, O^s)$ represents the probability of a sequence of tokens $q_{i-j+1}, \ldots, q_i$ from the token at position i−j+1 to the token at position i given a segment $O^s$ of the audio signal, K represents the set of all j-grams, j=1,2, . . . ,n, updated at step 506, $ETF_s(q_{i-j+1}, \ldots, q_i)$ is the expected term frequency in the lattice for the j-gram $(q_{i-j+1}, \ldots, q_i)$ and $ETF_s(q_{i-j+1}, \ldots, q_{i-1})$ is the expected term frequency for the history portion of the j-gram.

After the backoff weights have been calculated at step 510, the process of FIG. 5 determines if there are more lattices to be evaluated at step 512. If there are more lattices, the next lattice is selected at step 500 and steps 502, 504, 506, 508 and 510 are repeated for the new lattice. When there are no further lattices to process at step 512, the method of FIG. 5 ends at step 514.

Figure 6:
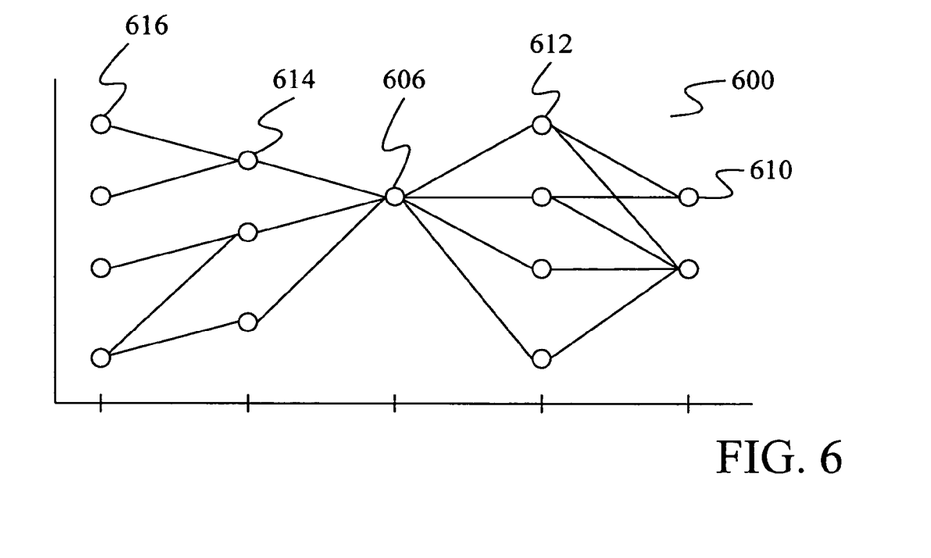
FIG. 6 is an example of a lattice where two portions of the lattice are connected by a silence token.

Under some embodiments of the present invention, the speech recognizer includes silence tokens in the lattice. These silence tokens represent portions of the audio signal that are recognized as not including any speech. FIG. 6 provides an example of a lattice 600 with a silence token 606.

Under one embodiment, when building the index, the silence tokens either operate as stops or are ignored when identifying the sequences of tokens. When a silence token acts as a stop, sequences of tokens along a path must stop when they reach a silence token. Thus, when the index extractor reaches token 610 for the path consisting of tokens 610, 612, 606, 614 and 616, it will only update the bigram of tokens 610 and 612 and the unigram of token 610. It will not update the 5-gram, 4-gram or trigram that would have included silence token 606.

When the silence token is ignored, the sequences of tokens are formed by skipping the silence token. Thus, when the index extractor reaches token 610, it would update a 4-gram for the sequences of tokens 616, 614, 612, and 610, a trigram for the sequence of tokens 614, 612 and 610, a bigram for the sequence of tokens 612 and 610 and the unigram for token 610.

The steps of generating the index files described above may be performed when a query is received. Under most embodiments, however, the index files are created off-line before a search query has been received.

After the index files have been created, the system is ready for searching. Under some embodiments of the present invention, a two stage search is performed. During the first stage, a user query 322 is provided to first stage search unit 324. First stage search unit 324 searches for the user query through a process described in FIG. 7.

Figure 7:
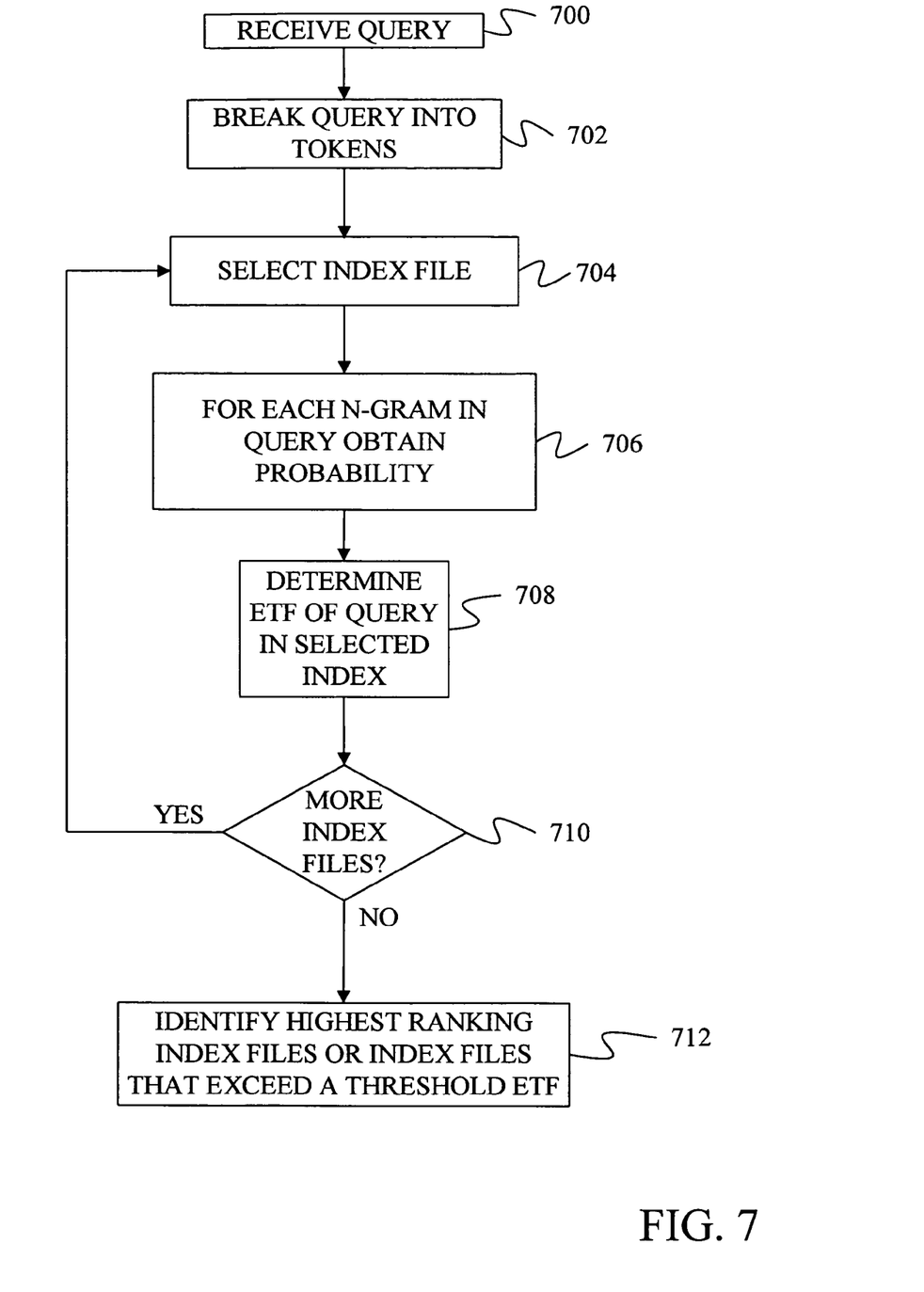
FIG. 7 is a flow diagram of a method of identifying segments from a query.

After receiving the query at step 700, search unit 324 breaks the query into tokens. Under some embodiments, these tokens are sub-word tokens such as phonemes or syllables. In other embodiments, where the query has multiple words, the tokens are individual words. At step 704, an index file from index files 314 is selected. At step 706, the tokens identified in step 702 are grouped into overlapping n-grams and for each n-gram a probability is determined using EQ. 2 above. Under EQ. 2, if the n-gram is present in the index, the probability is calculated using EQ. 3. To reduce the amount of time needed to compute the probabilities of the n-grams, the probabilities can be pre-calculated and stored instead of storing the expected term frequencies of the n-grams in the n−1 grams used in Equation 3.

If the n gram is not present in the index, but the history portion of the n-gram is present in the index, a backoff probability is determined using the backoff weight and the probability for the n−1 gram as determined using EQ. 2. If the history portion of the n-gram is not present in the index, the probability is determined using EQ. 3 with a shorter history such that, if a 5-gram had been used initially, a 4-gram would be used under EQ. 2 if the 5-gram were not preset in the index and the history portion of the 5-gram were not present in the index.

At step 708, the probabilities determined at step 706 for the n-grams are combined to determine an estimate of the probability of the query given the audio segment associated with the index. This probability is determined using:

$$P(Q \mid O^s) \approx \tilde{P}(Q \mid O^s) = \prod_{i=1}^{l} \tilde{P}(q_i \mid q_{i-n+1}, \ldots, q_{i-1}, O^s) \quad \text{EQ. 4}$$

where $P(Q|O^s)$ is the probability of the query given audio segment $O^s$, $l$ is the number of tokens in the query, $\tilde{P}(q_i|q_{i-n+1}, \ldots, q_{i-1}, O^s)$ is calculated using equation 2 above. Thus, the probability of the query is calculated as the product of the probabilities of overlapping sequences of tokens.

The estimate of the probability of the query given the audio signal associated with the index is then multiplied by the expected number of tokens in the audio signal to produce an expected term frequency for the query of:

$$\text{ETF}_s(Q) = \tilde{N}_s \cdot P(Q|O^s) \quad \text{EQ. 5}$$

For compound word queries, two expected term frequencies can be calculated. One can be calculated assuming that there is a pause between the compound word queries, and another can be calculated assuming no pause between the words. The two expected term frequencies are then summed to form the expected term frequency for the compound word query. In other embodiments, the expected term frequency that is the greater of the two is used as the expected term frequency for the query.

When no pause is assumed between the words, the ETF of the query is calculated by assuming that the sequences of tokens span words such that a sequence of tokens can include tokens from two different words. When a pause is assumed to be present, the pause acts as a stop. Thus, the probability for a token after a pause is calculated using the backoff strategy of Equation 2 with the unigram probability of the token. In such cases, a probability for a sequence ending with the silence token is similarly calculated using the back of strategy of Equation 2 with the unigram probability of the silence token.

In addition, the expected term frequency of the query determined from the sub-word units can be augmented by linearly interpolating that expected term frequency with an expected term frequency calculated at the word level. In particular, the query can be divided into sub-word tokens and word tokens. One expected term frequency for the query is then determined using the sub-word tokens and a second expected term frequency for the query is determined using the word tokens using the techniques described above. The two expected term frequencies are than linearly combined using interpolation weights to produce a final expected term frequency for the query.

Under another embodiment, a cascading system is used in which the expected term frequency is calculated at the word level if the words are present in the index. If the words are not present, the expected term frequency is calculated at the sub-word level. Such a cascade approach has been proposed in M.Sraclar, R. Sproat, *Lattice-based Search for Spoken Utterance Retrieval*, Proceedings HLTNAACL 2004. Other techniques for combining word-level expected term frequencies and sub-word-level expected term frequencies may also be used within the scope of the present invention.

After the expected term frequency of the query has been determined at step 708, the process of FIG. 7 determines if there are more index files at step 710. If there are more index files, the next index file is selected at step 704, and steps 706 and 708 are repeated to determine an expected term frequency of the query in the new index file.

When there are no further index files to be processed, the index files are ranked based upon their expected term frequency at step 712. The highest K ranking index files or all of the index files that have an expected term frequency above a particular threshold are then identified as files that are likely to contain the query. These files are identified as selected lattice files 326 in FIG. 3.

Under some embodiments of the present invention, the search technique ends with the identification of the selected lattice files. In other embodiments, an optional second stage search is performed as described further below.

Selected lattice files 326 are provided to a second stage search unit 328 that also receives the user query 322. Second stage search unit 328 performs a linear search of the lattices in selected lattice files 326 to identify the specific places within each lattice where the query appears. In addition, the second stage search generates a confidence measure indicating the likelihood of the query appearing in that location. This likelihood can be based on the speech recognition probabilities for the tokens associated with the query. The results of this second stage linear search can be ordered based on the confidence levels thereby forming a results list 330.

Because the selected lattice files 326 contain fewer lattice files than token lattice files 310, the linear search takes much less time than in the prior art.

Although the present invention has been described with reference to particular embodiments, workers skilled in the art will recognize that changes may be made in form and detail without departing from the spirit and scope of the invention.

What is claimed is:

1. A method of identifying a location of a query string in an audio signal, the method comprising:
receiving a query string;
selecting a segment of the audio signal from a plurality of segments of the audio signal;
determining a probability of the query string given the segment of the audio signal by determining the product of probabilities of overlapping sequences of tokens, the probabilities of overlapping sequence of tokens formed through steps comprising:
applying the audio speech signal to a speech recognizer that identifies a lattice of tokens from the audio speech signal and that assigns a probability to each token in the lattice based on the degree to which the audio speech signal matches an acoustic model for the token;
determining expected term frequencies for overlapping sequences of tokens in the lattice through steps comprising:
for each path through the lattice:
determining a probability of the path by multiplying the probabilities of the tokens along the path together; and
at each token along the path updating an expected term frequency for an overlapping sequence of tokens that ends at the token by adding the probability of the path to a current expected term frequency for the overlapping sequence of tokens; and determining the probability of an overlapping sequence of tokens based on the expected term frequency for the overlapping sequence of tokens;

using the probability of the query string given the segment of the audio speech signal to identify whether the segment of the audio speech signal is likely to contain the query string.

2. The method of claim 1 further comprising selecting a plurality of segments of the audio signal, determining a probability for the query string in each segment, and using the probabilities to rank the segments.

3. The method of claim 2 further comprising selecting at least one segment that ranks higher than another segment and searching the selected segment to identify at least one possible location of the query in the selected segment.

4. The method of claim 2 further comprising dividing an audio signal into segments of substantially similar durations.

5. The method of claim 4 wherein dividing the audio signal comprises identifying points of silence in the audio signal and dividing the audio signal at the points of silence.

6. The method of claim 4 wherein the step of dividing the audio signal is performed by a speech recognizer.

7. The method of claim 1 wherein the probabilities of overlapping sequences of tokens are determined from values stored in an index for the segment of the audio signal.

8. The method of claim 7 further comprising forming the index by first identifying a set of sequences of tokens found in a chosen set.

9. The method of claim 8 further comprising forming the chosen set using a background dictionary.

10. The method of claim 8 further comprising determining a set of backoff weights for sequences of tokens that are not found in the chosen set.

11. The method of claim 8 wherein at least one probability of an overlapping sequence of tokens is determined using a backoff weight.

12. The method of claim 1 wherein the probability of at least one overlapping sequence of tokens is estimated using the probability of a shorter sequence of tokens.

13. The method of 1 wherein the probability of at least one overlapping sequence of tokens is estimated using the probability of a single token.

14. The method of claim 1 wherein the query string comprises multiple words and determining a probability for the query string given the segment of the audio signal comprises multiplying a product of probabilities of overlapping sequences of tokens associated with a first word by a product of probabilities of overlapping sequences of tokens associated with a second word in the query string, and further by a probability for a unigram of silence.

15. The method of claim 14 further comprising determining a second probability for the query string by determining a product of overlapping sequences of tokens associated with the first and second word while assuming no silence between the first and second word.

16. The method of claim 15 further comprising determining a first expected term frequency from the probability for the query string and determining a second expected term frequency from the second probability for the query string and selecting one of the first expected term frequency and the second expected term frequency as a final expected term frequency for the query string in the segment.

17. The method of claim 15 further comprising determining a first expected term frequency from the probability for the query string and determining a second expected term frequency from the second probability for the query string and combining the first expected term frequency and the second expected term frequency to form a final expected term frequency for the query string in the segment.

18. The method of claim 17 wherein combining the first expected term frequency and the second expected term frequency comprises summing the first expected term frequency and the second expected term frequency to form the final expected term frequency.

19. The method of claim 18 wherein combining the first expected term frequency and the second expected term frequency comprises forming a weighted sum of the first expected term frequency and the second expected term frequency to form the final expected term frequency.

20. The method of claim 1 wherein the tokens comprise sub-word units.

21. The method of claim 20 wherein the tokens comprise phonemes.

22. The method of claim 1 further comprising determining an expected term frequency for the query string by determining a first expected term frequency component for overlapping sequences of sub-word units and a second expected term frequency component for overlapping sequences of words and combining the first expected term frequency component and the second expected term frequency component to form the expected term frequency component for the query string.

* * * * *